United States Patent

Bengio et al.

[11] Patent Number: 6,018,517
[45] Date of Patent: Jan. 25, 2000

[54] PROCESS FOR THE RENEWAL—DURING COMMUNICATION—OF THE TRAFFIC PARAMETERS OF AN ATM NETWORK

[75] Inventors: Samy Bengio, Montreal, Canada; Fabrice Clerot; Annie Gravey, both of Lannion, France; Daniel Collobert, Peoulec'h, France

[73] Assignee: France Telecom SA, Paris, France

[21] Appl. No.: 08/803,273

[22] Filed: Feb. 20, 1997

[30] Foreign Application Priority Data

Feb. 23, 1996 [FR] France ................................ 96 02519

[51] Int. Cl.$^7$ .......................... G01R 31/08; G06F 11/00; G08C 15/00; H04J 3/16
[52] U.S. Cl. .......................... 370/233; 370/468; 370/252
[58] Field of Search .................... 370/229, 230, 370/231, 232, 233, 235, 468, 395, 400, 252, 253, 412, 415; 706/6, 21, 25

[56] References Cited

U.S. PATENT DOCUMENTS 5,530,695  6/1996  Dighe et al. ............................. 370/232
5,675,384  10/1997  Ramamurthy et al. .................. 348/405

FOREIGN PATENT DOCUMENTS 0522391  6/1992  European Pat. Off. .

OTHER PUBLICATIONS

French Search Report dated Jan. 13, 1997.
Nevral Network.
Band Width Allocation For ATM Networks.
A Reservation Principle.

*Primary Examiner*—Chi H. Pham
*Assistant Examiner*—Steven Nguyen
*Attorney, Agent, or Firm*—J. Warren Whitesel; Laff, Whitesel & Saret, Ltd.

[57] ABSTRACT

A process for renegotiating, during a communication, the parameters of a traffic contract on an ATM network.

The present invention relates to a renegotiation process, during a communication on an ATM network, of the parameters of the traffic contract that relates to this communication. It is characterized in that it consists:

a. in predicting, for a predetermined period of time between two successive renegotiations, the maximal length that would be reached by a virtual file fed by the traffic of said communication, for at least a given thruput rate of said file.

b. in deducing from said maximal length one or more new parameters for the traffic contract, and c. in renegotiating with the network on the basis of said (new) traffic parameter or parameters for said period of time.

13 Claims, 5 Drawing Sheets

| pour obtenir | Ressources nécessaires... | |
|---|---|---|
| | avec DBR-10s | avec DBR sans renégociation |
| $R_{mean} = 0.9$ Mb/s | $L_{max} = 0.4$ Mb | $L_{max} = 23.1$ Mb |
| $L_{mean} = 0.09$ Mb | $R_{mean} = 0.9$ Mb/s | $R_{mean} = 5.5$ Mb/s |
| $L_{max} = 0.4$ Mb | $R_{mean} = 0.9$ Mb/s | $R_{mean} = 3.7$ Mb/s |

FIG. 6

PROCESS FOR THE RENEWAL— DURING COMMUNICATION— OF THE TRAFFIC PARAMETERS OF AN ATM NETWORK

The present invention relates to a process for renegotiating, during a communication, the parameters of a traffic contract on an ATM network.

BACKGROUND OF THE INVENTION

An ATM network (Asynchronous Transfer Mode) is a network in which the transmission of informations is based on the asynchronous time multiplexing of information packets, called cells, of fixed length. It is possible to transport, on such a network, any service, such as an audio, a video or a data transmission service, independently of its intrinsic characteristics such as, for example, the binary thruput, its quality characteristics or its sporadic nature. It is for these reasons that this technique of cell transfer by asynchronous time multiplexing has been retained as transfer mode by the wide band numerical networks with integration of services, called BISDN networks.

Nevertheless, in order to guarantee the service quality and to supply the passing band required by the applications, it has proved necessary to provide for various controls. This proves especially true for cases of traffic with highly sporadic thruput, such as those caused by the interconnection of local networks.

These controls relate, for the one part, to the network parameters controls, or to the controls of use parameters, that relate to the aggregate of the actions performed by the network to oversee and control traffic on an ATM connection. The invention does not relate to this type of controls. It does relate, however, to the control of a connection acceptance, a control, that aims at accepting or refusing a connection, when its establishment is requested, on the basis of whether or not the quantity of available resources permits to transport the new connection through the entire network, with the required quality of service.

Thus, at the time a connection is established, there is passed, between the user and the network, a traffic contract that comprises on the one part a traffic descriptor of the connection under consideration and, on the other part, the required service quality level (QoS). These informations are supplied by the user, at the time the connection is established, by means of signalling for example.

The traffic descriptor of the connection that is being established may comprise the following four traffic parameters: the maximal cell thruput of peak rate (PCR, Peak Cell Rate), the variation in the tolerance of the cell delay, or gigue tolerance ($to_{PCR}$), and possibly the projected cell rate (SCR, Sustainable Cell Rate) and its associated tolerance, $to_{SCR}$.

By subscribing to the contract, the user assumes the obligation that the traffic he sends will comply with the traffic defined by the parameters of the contract, while the network ensures a respect for thruput rate and for gigue tolerance as soon as this compliance is achieved. The obligation for the traffics to comply with their contract thus protects the network against the arrival of uncontrolled bursts of volume, and makes it possible to reserve, within the network, the resources needed to guarantee the required quality of service.

From the above-mentioned traffic parameters, four traffic contract definitions have been proposed, that are respectively called the deterministic bit rate mode, DBR; the statistical bit rate mode, SBR; the ATM block transfer mode, ABT; and the Available Bit Rate Mode, ABR. A review of these four definitions is found in the article of J. Mignault, A. Gravey and C. Rosenberg titled "A Survey of straightforward Multiplexing Models for ATM Networks: in ATM Expert RACE Symposium, 1995. " They also constitute the object of the recommendation I.371 of the ITU-T.

In the DBR mode, the source or user simply states, at the time of the connection, the maximal cell rate he intends to respect during the entire duration of the communication. The reservation of the network resources then takes place on the basis of this maximal rate, while the quality guarantees "QoS" are given in terms of delay and of rate of cell loss. This mode essentially is meant for connections with constant bit rate (CBR).

For connections that take on services with variable bit rate, VBR, the source or user can state, in the so-called SBR mode, a sustainable cell rate in addition to the peak rate, PCR.

From the traffic parameters negotiated at the time of the contract it is possible to estimate a passing band equivalent to the traffic of the connection involved, as a function of the link rate, of the available resources in the network, and of the required quality of service. The reservation of the resources thus is made in the network on the basis of this estimated passing band.

The ABT mode aims to protect the quality of service at the level of the rasters rather than at the level of the cells. In this mode, the source negotiates a maximal peak rate $PCR_{max}$, for the duration of the call, and uses a negotiation in the band. The reservation of resources then is made on the basis of the lowest one, between the peak-rate PCR and the maximal peak-rate, $PCR_{max}$ values.

As for the ABR mode, it is meant for the sources of data.

The compliance of a cell with the traffic contract established by the user is defined by means of an algorithm such as the "leaky bucket" algorithm LB, or of its equivalent, the Virtual Scheduling algorithm (VS).

In the DBR mode, the traffic of a connection is in compliance wtih respect to these algorithms, as long as the length of a virtual waiting file, fed by the traffic of the connection under consideration and emptied at the negotiated peak rate PCR, does not exceed the maximal length $L_{max}$ defined with respect to the stated gigue tolerance $to_{PCR}$ by means of the following equation:

$$L_{max} = PCR \times to_{PCR}.$$

In the SBR mode, the algorithmic definition of the sustainable rate SCR is similar to that of the peak-rate PAR, except that it is associated with a higher gag tolerance $to_{SCR}$.

These traffic contracts generally are defined for the entire duration of the communication, this making difficult the optimal use of the network resources, especially in the case of sporadic traffics that are poorly defined in terms of the passing band over the entire duration of a communication. The traffic parameters, in the end, are therefore hard to define over the entire duration of the communication. There results from this that the reservations of resources for a peak-rate, that are valid for the entire duration of the communication, unavoidably cause a waste of resources, computed in terms of passing band.

SUMMARY OF THE INVENTION

The purpose of the present invention is dynamically to provide for the renegotiating of the parameters of the traffic contracts in the course of an established communication. This renegotiating, in order to be efficiently executed, presents the problem of predicting the needs of the source for the validity duration of the contract or contracts to come. In an article that appeared in Computer Communications, Vol. 18, of Aug. 8, 1995 and titled "Traffic prediction and dynamic band width allocation over ATM: a neutral network approach", Moh et al describe the use of neuron networks to predict the passing band that will be required at the renegotiation time, and the allocation of the predicted band. Now, in this article, no account is taken of the fact that the renegotiation deals not with the passing band, but with the traffic parameters indicated above.

The purpose of the present invention, therefore, is to provide for the renegotiating of the parameters in traffic contracts, dynamically, during the communication that has been established, and for taking into account the fact that this renegotiating bears on the traffic parameters.

In order to reach this goal, a process for renegotiating, during a communication on an ATM network, the parameters of the traffic contract relative to this mentioned communication consists, according to the invention:

a. in predicting, for a pre-set period of time between two successive renegotiations, the maximal length that a virtual file fed by the traffic of this communication might reach, for at least a given thruput rate of this file.

b. in deducing from this maximal length one or several new parameters of the traffic contract, and c. in renegotiating with the network, on the basis of the above-mentioned traffic parameter or parameters, for the above-mentioned time period.

According to an advantageous variation, it consists:

a. in predicting, for a preset period of time between two successive renegotiations, all of the maximal length values that a virtual file fed by the traffic of the above-mentioned communication would reach for an aggregate of constant thruput rate values of this file.

b. in deducing, from these file length values and from the above-mentioned corresponding thruput rate values, one or several new parameters for the traffic contract, and c. in renegotiating with the network on the basis of the above-mentioned traffic parameter or parameters for the above-mentioned period of time.

According to another characteristic of the invention, said deducing step under b., of new parameters for the traffic contract is achieved as a function of the declared values for the gag tolerance on the traffic, in the contract with the network.

Thus, the renegotiating of step c. can be done in a mode in which the sole parameter of the traffic contract to be renegotiated is the cell peak-rate PAR. For the deducing in step b., this peak-rate is then determined with the help of the following equation:

$$L_{max}(PAR) = to_{par} \times PAR$$

in which $to_{PAR}$ represents the gag tolerance in the above-mentioned mode and $L_{max}$ the maximal value predicted for the length of the above-mentioned virtual file for a thruput rate value equal to PAR.

The renegotiating of step c. may also be executed in a mode in which the parameters of the traffic contract are, on the one hand, the peak cell rate PAR, and on the other hand, the projected cell rate SCR. In this case, for the deducing of step b., this above-mentioned peak-rate is determined by means of the following equation:

$$L_{max}(PAR) = to_{PAR} \times PAR$$

and the projected rate is computed using the following equation:

$$L_{max}(SCR) = to_{SCR} \times SCR$$

in which $to_{PAR}$ represents the gag tolerance for the PAR thruput in the indicated mode, $to_{SCR}$ represents the gag tolerance for the above-mentioned SCR thruput rate in the indicated mode, $L_{max}(PAR)$ represents the maximal predicted value for the length of the above-mentioned virtual file for the thruput value equal to PAR, and $L_{max}(SCR)$ is the predicted maximal value of the length of the above-mentioned virtual file, for a thruput rate value equal to SCR.

The renegotiating of step c. may further be carried out in a mode in which the traffic contract parameters comprise the peak-rate PAR and the maximal peak-rate $PAR_{max}$, the lowest one between the two values for the above-mentioned rate serving as the basis for said renegotiating.

The above predicting step a. may be executed from the value taken on by the length of the virtual file at the time of renegotiation, from the value taken on by the thruput rate of the above-mentioned file in the period preceding the renegotiating point in time, and from informations that characterize the traffic in at least the period that precedes the renegotiating point in time.

These informations characterizing the traffic are obtained, for example, by taking into account a predetermined number of consecutive time intervals that precede the time of renegotiation, and by determining, inside each time interval, the value taken on by at least one magnitude that is characteristic of the traffic, all of the above-mentioned values thus obtained forming the above-mentioned informations.

In a variation in execution, there is considered the time series that is formed by all of the values taken on by the magnitude or magnitudes characteristic of the traffic in the above-mentioned time intervals, and there are determined the first moments of the time series, these moments then constituting the above pieces of information that characterize the traffic. The above-mentioned moments of the above-mentioned time series, that are used are, for example, the average and the variant.

Said magnitude or magnitudes characteristic of the traffic may be or may comprise the number of traffic bits or cells in each time interval. They may also be or may comprise the arrival time between two consecutive cells of the traffic.

For the prediction step, there is advantageously used a network of neurons that comprises an apprenticeship cell meant to supply it with the weights of each one of its neurons after determination of these weights, said determination being effected over a preset length of time, from the traffic of the connection under consideration.

BRIEF DESCRIPTION OF THE DRAWINGS

The above-mentioned characteristics of the invention, as well as others, will appear more clearly from reading the following description of an example of execution, said description being given in relation to the attached drawing in which:

FIG. 6 is a table that illustrates the interest of the renegotiation in the course of communication.

DETAILED DESCRIPTION OF THE INVENTION

Figure 1A:
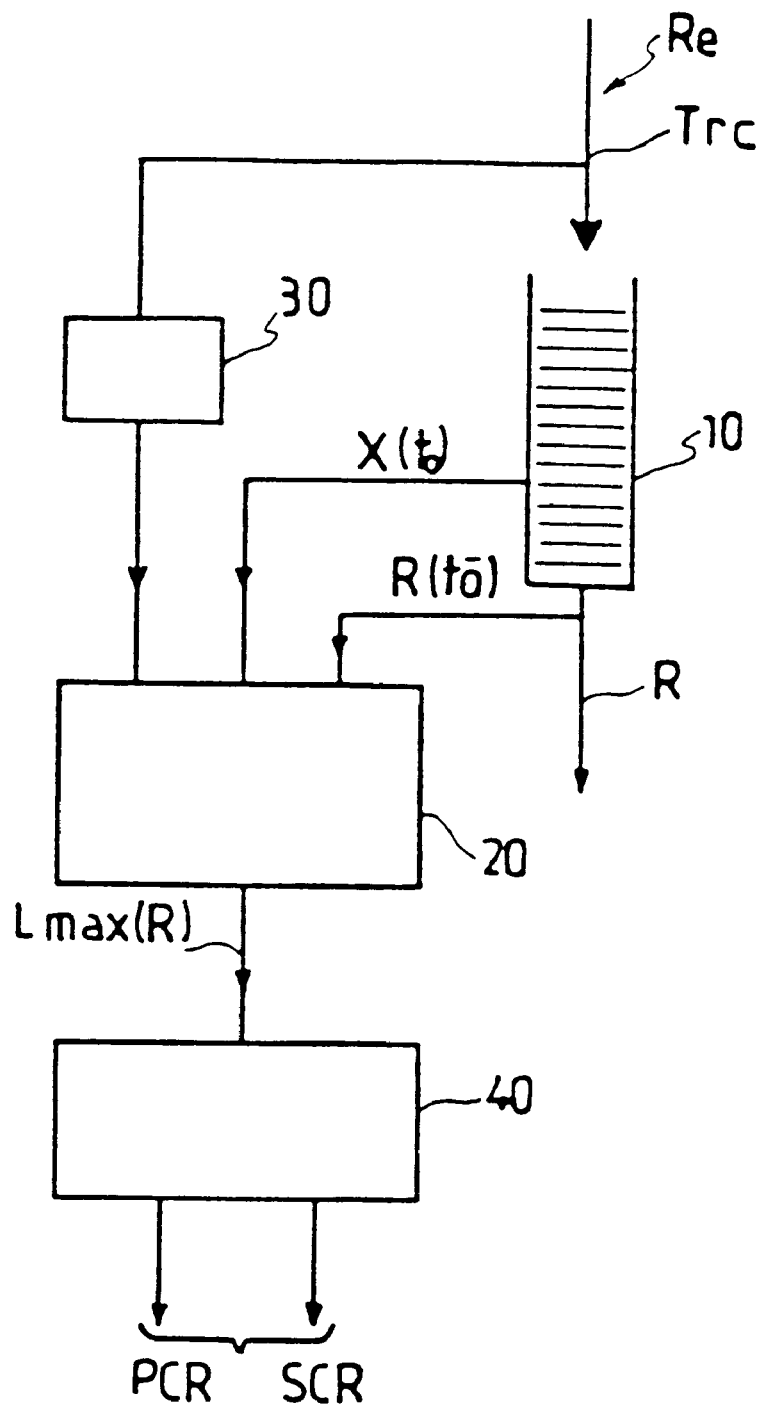
FIGS. 1a and 1b are synoptic diagrams that illustrate different modes of execution of a process for renegotiation according to the present invention.

There is shown in FIG. 1a a synoptic diagram that illustrates the process of the invention. In this FIG. 1a, one can see a virtual waiting file 10 that corresponds to a "leaky bucket" that is fed by the traffic Trc of the connection that is being processed and the thruput rate of which is R.

In one mode of execution of the invention, the length of the file 10 is not limited at the top. Thus, no cell is eliminated by overflowing of this file.

In the continuation of the description, there will be called $t_o$ the time at which each renegotiation of the traffic parameters takes place, and this for the period that extends, therefore, from $t_o$ to $t_o+T$, in which T is the period of time between two successive renegotiations. This period of time T may be 10 seconds, for example.

At the time $t_o$ of the renegotiation, file 10 delivers the value of the file length $X(t_o)$ as well as the value of the thruput rate $R(t_o)$. The value $R(t_o)$ is the value of the thruput rate of the file 10 at the point in time $t_o$, but before the renegotiation has taken place.

The two values $X(t_o)$ and $R(t_o)$ are supplied to the two corresponding inputs of a predictor 20, a third input of which receives an information that characterizes traffic prior to the point in time $t_o$, and that is supplied by an element 30. In order to be able of delivering this information, element 30 receives, on its input the traffic Trc of the connection that is being processed.

According to a mode of execution of the invention, in order for the function of element 30 to be carried out, each time interval ($t_o$, $t_o+T$) between two successive negotiations is divided, time-wise, into several equal consecutive time sub-intervals, and there is determined, for each one of these sub-intervals of time, the value taken on by at least one magnitude that is characteristic of the traffic Trc, such as for example the number of bits, N, of this traffic, the time of arrival t between two cells, etc. If there is called G the value taken on by this magnitude or this association of magnitudes (G={N, t, . . . ,}), there is thus obtained a time series S of the traffic Trc that is equal to {G(1), G(2) . . . G(i) . . . G(n)}, in which the indices i=1 to n represent the order numbers of the time sub-intervals.

As an example, each time interval of 10 seconds has been divided into one hundred time sub-intervals, and there has been considered, as characteristic magnitude of the traffic, the number of bits in each one of these time sub-intervals.

In a first mode of execution of the invention the time series S is then directly supplied to the predictor 20.

In a second mode of execution, rather than delivering the time series S, there are only delivered the first two moments of the time series, that is to say the mean and the variance. This solution is advantageous relative to the preceding one because it limits the number of inputs of predictor 20, and therefore its complexity.

In other modes of execution, there are delivered, in addition to the first moments of the time series S, the moments of higher order.

The output of predictor 20 delivers a group of predicted values $L_{max}$ (R) of the maximal length that file 10 would reach if it were emptied at different constant values for its thruput rate R during the period ($t_o$, $t_o+T$) that follows the point in time $t_o$.

Figure 1B:
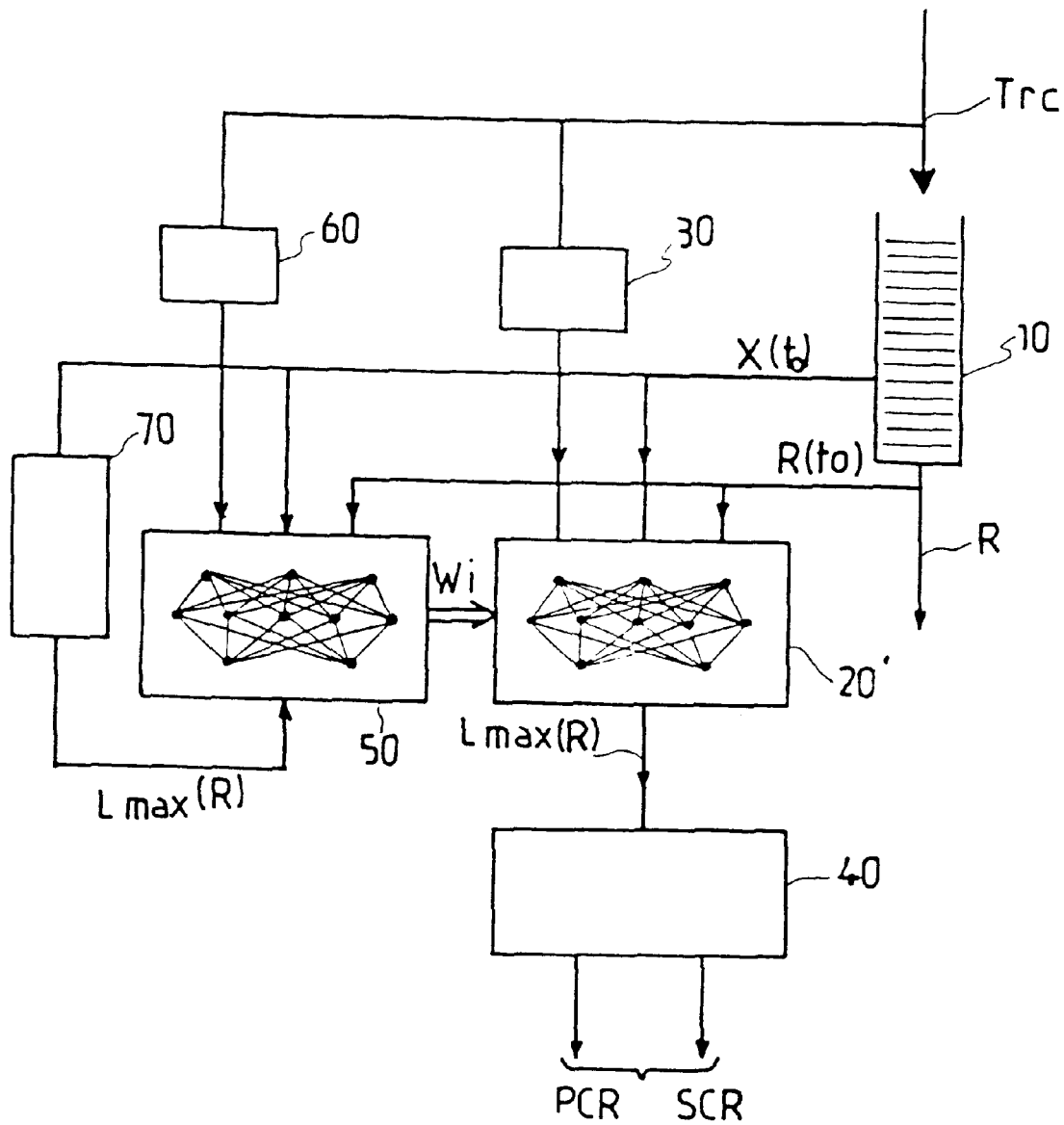

FIG. 1 illustrates a process according to the invention, similar to that described in relation to the FIG. 1a but the predictor of which is a network of neurons 20', of the multi-layer Perceptron type, especially with three layers, for example: an input layer, a hidden layer and a thruput layer connected, in a manner well known in itself, by synapses. This network of neurons comprises three inputs, a single output and the number of neurons on the hidden layer may vary between 5 and 10.

For its apprenticeship, the network of neurons 20' comprises an apprenticeship cell 50 with three inputs respectively receiving the thruput rate $R(t_o)$ at point in time $t_o$, the total length $X(t_o)$ of the file 10 at point in time $t_o$, and an information that characterizes the traffic prior to point in time $t_o$ and that is supplied by an element 60 identical with element 30. In order to be able to deliver this information, element 60 receives on its input the connection traffic that is being processed. It further comprises an element 70 for the computation of the maximal length $L_{max}$ (R) of file 10 as a function of the thruput rate R. This computation element 70 is connected to the apprenticeship cell 50.

The apprenticeship cell 50 is, for example, used in an apprenticeship algorithm by retropropagation of the error.

The apprenticeship cell 50 determines, after reception of the elements that are supplied to it at its inputs at each point in time $t_o$, and this over a predetermined period of time, the weights $w_i$ of each neuron of the network of neurons 20', and it will unload them into the network 20' after this predetermined period of time. This is the apprenticeship operation.

This operation of the estimation of the weights of the network by apprentiship may be very long, the problem being NP-complete. But there is known, however, how to find sub-optimal parameters in polymonial times.

It will be noted that the apprenticeship operation is carried out on the traffic Trc, but not in real time.

The aggregate of predicted $L_{max}$ (R) values that is delivered by the predictor 20 or by the neuron network 20' is supplied to a unit 40 for the determination of the traffic parameters that, as a function of the parameters set at the time the connection is established—these parameters being the stated gag tolerance $to_{PAR}$ and the projected gag tolerance $to_{SCR}$ that define the quality of the connection QoS—delivers the values of the parameters that will be the object of the renegotiation of the traffic contract for the period of time extending from $t_o$ to $t_o+T$. These contract parameters respectively are the peak-rate PAR in a mode with deterministic bits thruput rate, DBR, and in the statistical rate of bit mode SBR, the peak-rate PAR and the projected thruput rate SCR. In the mode with ATM Block Transfer, ABT, there is also to be added the maximum peak-rate $PA_{max}$.

It will be noted that in the ABT mode, the time period of renegotiation of the traffic parameter PAR is shorter than that of the $PAR_{max}$ parameter. For example, if the time period is 10 seconds for the determination of the $PAR_{max}$ parameter, it is only one second for the determination of the PAR parameter. It will be recalled that the renegotiation is done on the lowest one of the two values, that is to say on min(PAR, $PAR_{max}$).

Figure 3:
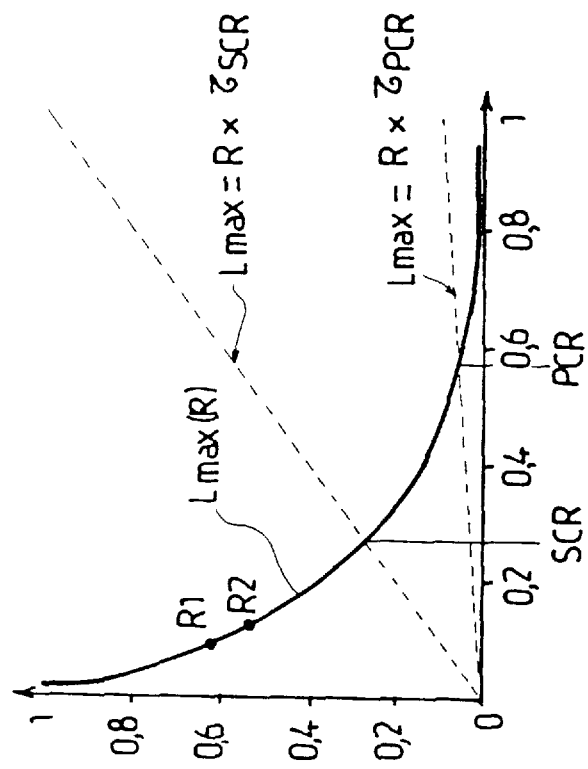
FIG. 3 is a curve that illustrates the determination of the traffic parameters.
Figure 2:
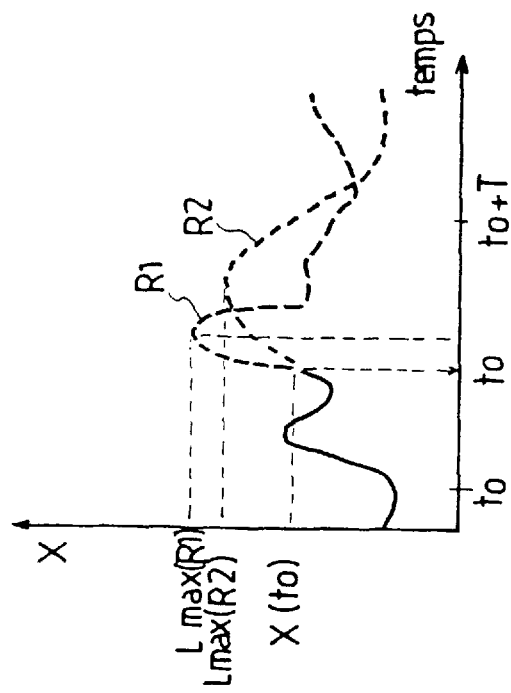
FIG. 2 is a curve that shows the evolution, as a function of time, of the length of a file fed by the traffic.

In FIGS. 2 and 3 there is illustrated the step of the present invention process executed by unit 20.

In FIG. 2, there is seen the curve representative of the variation in length of file 10, X, as a function of time. Up to the point in time $t_o$ of renegotiation, the curve is drawn in heavy lines to show that there is represented the length such as it really was. After point in time $t_o$, the curve becomes subdivided into two curves for two thruput rates of file 10 that respectively take on the constant values R1 and R2. These two curve parts are traced in dotted lines to show that we are dealing here with the length of the file such as it effectively would be after point in time $t_o$, for thruput rates R1 and R2, respectively. In this way the observer is placed at point in time $t_o$. The predictor 20 or 20', for its part, can predict for each thruput rate R the maximal file lengths $L_{max}$ (R). There have been represented the predicted maximal file lengths $L_{max}$ (R1) and $L_{max}$(R2), In FIG. 3 there is represented a curve that shows the maximal file length $L_{max}$ (R) that file 10 should reach for the time period $t_o+T$, and this as a function of the output rate R of file 10. There have been plotted, for the sake of example, the points that correspond to the output rates R1 and R2 in FIG. 2.

The values of the thruput peak-rate PAR and of the thruput projected rate SCR are the values taken on, respectively, by the thruput rate at the intersection of the curve representative of the function $L_{max}$ (R) with on the one hand, the equation straight line $L_{max}=R \times to_{PER}$ and, on the other hand, the equation straight line $L_{max}=R \times to_{SCR}$. In this way the value of the peak rate PAR is the value of R that verifies the equation:

$$L_{max} (R) = R \times to_{PAR}. \quad (1)$$

Likewise, the peak-rate SCR is the value of R that verifies the equation:

$$L_{max} (R) = R \times to_{SCR}. \quad (2)$$

As it may be seen, these PAR and SCR values assure the network that the connection will comply with the traffic contract since this compliance is defined, precisely, by the equations (1) and (2) above.

This nevertheless assumes that the prediction is correct. It will be shown, further down in the description, that indeed it is correct.

There are given below results of simulations of traffic contract renegotiations, making use of the process according to the present invention. These simulations were carried out from a tracing of real traffic that consists of a two hours recording of TCP traffic at the Lawrence Berkeley Laboratory bridge toward the Internet network. This tracing was the object of a study published in the journal Proc. Sigcomm'94, Computer Communication Review, 24 (1994), pp. 257–268, in a article titled "Wide area Traffic: the failure of Poisson modelling" by V. Paxson and S. Floyd. This tracing was chosen for the reason that it is truly representative of the traffic that is to be expected within the framework of the interconnection of local networks.

There have been used the following gag parameters, for the algorithm of virtual spacing: $to_{PAR}=0.1$ s, and $to_{SCR}=1$ s.

In the case of the deterministic bit rate mode DBR, the peak-rate of cells PAR is predicted, at each point in time $t_o$, for the next time period of 10 s duration. As already indicated, the reservation of the resources at the time of renegotiation is carried out on the basis of the peak-rate PAR. In the continuation of the description, this renegotiated contract shall be called DBR-10s.

In the ABT mode, the maximum peak-rate $PA_{max}$ is predicted for the next time period of 10 s while the peak-rate PAR is predicted every second. The reservation is made on the basis of the smaller one of the values PAR and $PA_{max}$. This contract will be called ABT-10s.

In the statistical bit rate SBR, the peak-rate PAR and the sustainable rate SCR are predicted, at each point in time $t_o$, for the next time period of 10 s. Considering an acceptable cell loss rate, CLR, of $10^{-9}$, a 1 Mbit size for file B, and a link rate $R_{max}$ of 155 Mbits/s, the equivalent band is deduced from the rates PAR and SCR, by computation, and the reservation is made on the basis of this band. That contract will be called SBR-10s.

In the continuation of the description, in each one of the above-mentioned modes, there are compared the performances of the process according to the invention, the prediction being made by the predictor 20 or 20', with the performances of an "oracle" that carries out the same process with the exception of the determination of the length $L_{max}$(R) that is not predicted, but obtained from real data of the next time periods that it has therefore already received.

Figure 4:
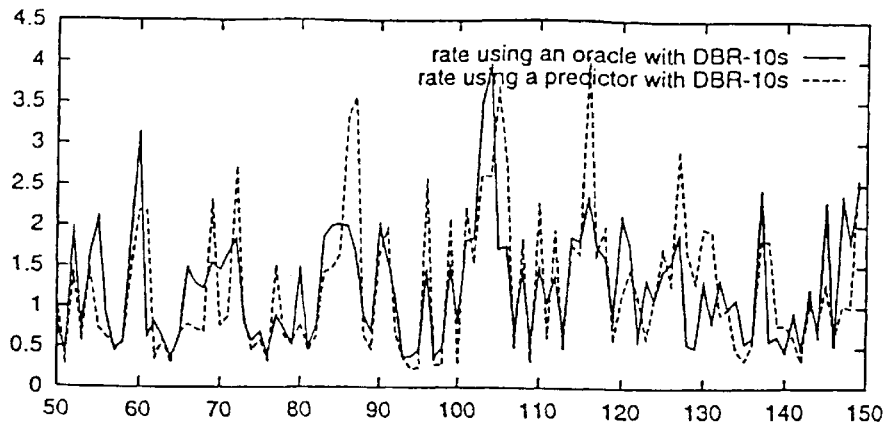
FIG. 4 is a graph that shows two curves respectively obtained by the execution of a process according to the invention, and by the execution of a process with an "oracle", these curves being obtained for a renegotiation in DBR mode.

There are represented in FIG. 4, on a same graph, two curves that respectively show, as a function of time, the evolutions of the rates expressed in Megabits per second, a renegotiation in DBR modethat has been carried out—on the one hand and shown in heavy lines—according to the process of the invention with prediction at 10 seconds and—on the other hand, and shown in dotted lines—with the "oracle" operating with real data. This curve was(sic) plotted in the most sporadic part of the above-mentioned tracing.

As it may be seen, the rate values reached and the dynamics of the curves respectively obtained with prediction and with the oracle are, although punctually different, very close. There may be concluded from this that it is possible to make, with a 10 second horizon, predictions precise enough to renegotiate a contract of the DBR type.

Figure 5A:
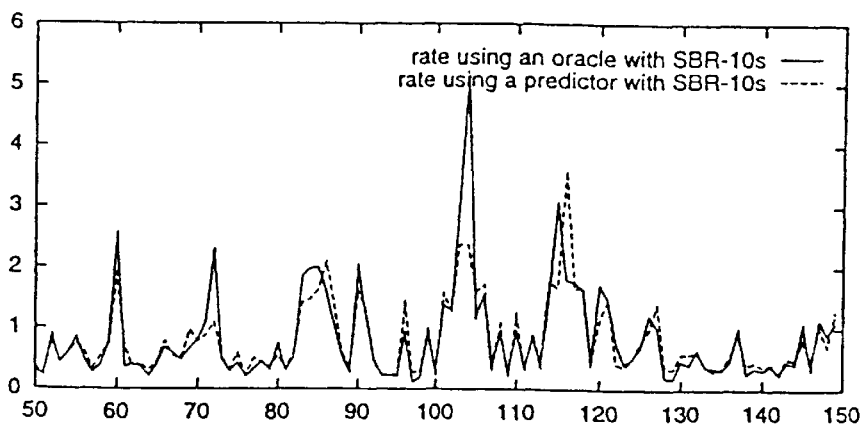
FIGS. 5a and 5b are curves traced under conditions similar to those in FIG. 4, but for a renegotiation in SBR mode.
Figure 5B:
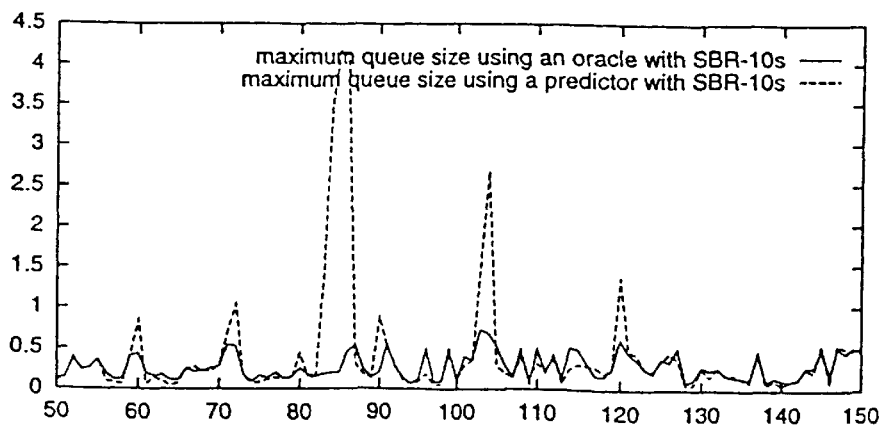

There are shown in curve 5a two curves, one in heavy line and the other one in dotted lines, similar to the two curves in FIG. 4, but for a renegotiation in SBR mode, and this for the same part of the same tracing. FIG. 5a also shows the two curves corresponding to the evolutions of the length of the virtual file as a function of time, with prediction and with the oracle, respectively.

It can be seen that the process with prediction obtains excellent results with respect to the mean values, but that these results are somewhat less good with respect to the maximal values taken on. It will be noted, however, that the dynamics of the equivalent bands obtained with the oracle and the predictor nevertheless are very close. It is therefore possible to conclude that it is effectively possible to make, with a 10 second horizon, predictions that are accurate enough to renegotiate a contract in the SBR mode.

FIG. 6 shows a table that lists, on the one hand in a so-called DBR-10s mode and, on the other hand, in a DBR mode without renegotiation, for a given thruput rate $R_{mean}$, the necessary maximal length of the file, conversely, for a given desired mean length $L_{mean}$, the mean thruput rate $R_{mean}$ obtained and, for a desired maximal length $L_{max}$, the mean thruput rate $R_{mean}$ obtained.

This table illustrates the interest found in renegotiating a contract in the cases of sporadic traffic. It can indeed be observed that the renegotiation makes it possible to economize resources.

It will be noted that the use of the process according to the invention is not restricted to the user interface (in English User Network Interface UNI) but can be used at all of the network interfaces, such as for example the interface between networks (NNI) Network Node Interface).

We claim:

1. A renegotiation process carried out during a communication on an ATM network for determining the parameters of a traffic contract relative to said communication, said process consisting of the steps of:

a) carrying out a learning phase for finding a predictor and determining a characteristic of said predictor on a basis of information about the traffic that feeds a file and of a maximum length of said file calculated as a function of the output rate of said file;

b) predicting responsive to said predictor a predetermined period of time between two successive renegotiations, said period of time having a maximum length that is required for a virtual file to reach if fed by the traffic of said communication for at least one give thruput rate of said file, c) deducing in response to said maximum at least one new parameter for the traffic contract, and d) renegotiating with the network on a basis of said at least one parameter for said period of time.

2. A renegotiation process carried out during a communication on an ATM network relating to parameters of a traffic contract relative to said communication, said process consisting of the steps of:

a) carrying out a learning phase relative to a predictor for finding characteristics of said predictor, said characteristics being determined on a basis of information about the traffic that feeds a file and on a basis of a maximum length of said file calculated as a function of an output rate of said file;

b) using said predictor for predicting a predetermined period of time between two successive renegotiations for maximum values of a length of time which a virtual file would require if fed by the traffic of said communication for an aggregate of constant values of the thruput rate;

c) deducing at least one new parameters for the traffic contract from a length of values and from said thruput rate; and d) renegotiating with the network on a basis of said at least one new traffic parameter for said period of time.

3. A process according to either claim 1 or 2, wherein said predictor is a neurons network and said prediction characteristics is a weight of each neuron in said network.

4. A renegotiation process according to one of the claims 1 or 2, wherein said deducing in step (c) of said at least one new parameter of the traffic contract is carried out as a function of gag tolerance values on the traffic in the traffic pattern with the network.

5. A renegotiation process according to claim 4, wherein the renegotiation of step (d) is carried out in a mode in which only the traffic contract parameter cell peak rate PAR is renegotiated and wherein the deducing in step (c) determines said peak-rate by means of the following equation:

$$L_{max}(PAR) = to_{PAR} \times PAR$$

In which to $_{PAR}$ represents the gag tolerance in said mode, and $L_{max}(PAR)$ represents maximal predicted value for the length of said virtual file for a thruput rate value equal to PAR.

6. A renegotiation process according to claim 4, wherein the renegotiation in step (d) is carried out in a mode in which the traffic contract parameters are the peak cell rate PAR and the projected cell rate SCR, and wherein the deducing of step (c) determines said peak-rate by means of the following equation:

$$L_{max}(PAR) = to_{PAR} \times PAR$$

And the projected rate is determined using the following equation:

$$L_{max}(SCR) = to_{SCR} \times SCR$$

In which to $_{PAR}$ represents the gag tolerance for said rate PAR in said mode, to $_{PAR}$ represents the gag tolerance for said rate SCR in said mode, $L_{max}(PAR)$ represents the maximum predicted value for the length of said virtual file for a thruput rate value equal to PAR, and $L_{max}(SCR)$ represents the maximal predicted value for the length of said virtual file for a thruput rate value equal to SCR.

7. A renegotiation process according to claim 5 or 6 wherein the renegotiation in step (d) is performed in a mode in which the traffic contract parameters comprise the peak-rate PAR and the maximal peak-rate $PAR_{max}$, the lower of the two rates PAR and $PAR_{max}$ serving as a basis for said renegotiation.

8. A renegotiation process according to one of the claims 1 or 2 wherein said prediction step (b) is performed starting from a value taken by the virtual file at the time of renegotiation, from a value taken by the thruput rate of the file in the period preceding the renegotiation, and from information that characterizes the traffic in at least a period preceding the renegotiation.

9. A renegotiation process according to claim 8, wherein said information that characterizes traffic is obtained from a predetermined number of consecutive time intervals that precede the time of the renegotiation, in determining a value inside each time interval taken on by at least one characteristic of the traffic, a group of values thus obtained forming said information.

10. A renegotiation process according to claim 8, wherein said information that characterizes traffic is obtained from a predetermined number of consecutive time intervals that precede the time of the renegotiation, in determining a value inside each time interval taken by at least one characteristic of the traffic, the group of values thus obtained forming a time series, and is determined during the first moments in a time series that then constitutes the information.

11. A renegotiation process according to claim 10, wherein said moments of said time series are both a means and a variant.

12. A renegotiation process according to claim 9, wherein said characteristic traffic comprises the number of traffic cells or bits in each time interval.

13. A renegotiation process according to claim 11, wherein said characteristic traffic comprises an arrival time between two consecutive traffic cells.

* * * * *